(12) United States Patent
Hicklin et al.

(10) Patent No.: US 10,047,698 B2
(45) Date of Patent: Aug. 14, 2018

(54) GAS TURBINE WITH GAP SEALING BETWEEN GAS-WASHED COMPONENTS

(71) Applicant: ROLLS-ROYCE PLC, London (GB)

(72) Inventors: Mark Hicklin, Derby (GB); Darren Robert Smith, Derby (GB)

(73) Assignee: ROLLS-ROYCE plc, London (GB)

( * ) Notice: Subject to any disclaimer, the term of this patent is extended or adjusted under 35 U.S.C. 154(b) by 319 days.

(21) Appl. No.: 14/494,197

(22) Filed: Sep. 23, 2014

(65) Prior Publication Data

US 2015/0114005 A1 Apr. 30, 2015

(30) Foreign Application Priority Data

Oct. 31, 2013 (GB) .................................. 1319256.2

(51) Int. Cl.
*F02K 1/80* (2006.01)
*B29C 65/54* (2006.01)
(Continued)

(52) U.S. Cl.
CPC ............ *F02K 1/805* (2013.01); *B29C 65/542* (2013.01); *F01D 11/001* (2013.01);
(Continued)

(58) Field of Classification Search
CPC .. F01D 11/005; F01D 11/001; F05D 2300/43; F05D 2300/431; F05D 2300/612;
(Continued)

(56) References Cited

U.S. PATENT DOCUMENTS 5,776,579 A * 7/1998 Jessup ....................... B32B 3/12
428/73
6,371,411 B1 * 4/2002 Breer ....................... F02C 7/047
244/134 B
(Continued)

FOREIGN PATENT DOCUMENTS

EP   1 621 752 A2   2/2006
EP   2492448 A2    8/2012
GB   2 385 382 A    8/2003

OTHER PUBLICATIONS

Mar. 10, 2015 Search Report issued in European Application No. 14185908.
(Continued)

*Primary Examiner* — Carlos A Rivera
*Assistant Examiner* — Thuyhang Nguyen
(74) *Attorney, Agent, or Firm* — Oliff PLC

(57) ABSTRACT

A gas turbine engine having a fan and a bypass duct for discharging airflow from the fan to generate engine thrust. The bypass duct includes a first component and a second component each having a gas washed surface, the first component being positioned adjacent the second component with a gap therebetween. A sealing strip is positioned in the gap between the first component and the second component distal to the gas washed surfaces of the first and second components. A sealant is positioned between the first and second component proximal to the gas washed surfaces of the first and second components, so as to seal the gap between the first component and the second component from airflow through the bypass duct.

17 Claims, 12 Drawing Sheets

(51) Int. Cl.
*F02K 3/04* (2006.01)
*F01D 11/00* (2006.01)

(52) U.S. Cl.
CPC .............. *F01D 11/005* (2013.01); *F02K 3/04* (2013.01); *F05D 2300/43* (2013.01); *F05D 2300/431* (2013.01); *F05D 2300/615* (2013.01); *Y02T 50/671* (2013.01)

(58) Field of Classification Search
CPC ...... F05D 2300/615; F02K 1/805; F02K 3/04; B29C 65/542; Y02T 50/671; F16J 15/06; F16J 15/08; F16J 15/027; F16J 15/0893; F16J 277/605; F16J 277/645
USPC ................ 60/226.1; 137/15.1; 277/647, 650, 277/652–654
See application file for complete search history.

(56) References Cited

U.S. PATENT DOCUMENTS

| | | | | |
|---|---|---|---|---|
| 7,967,556 | B2* | 6/2011 | Gummer | F04D 27/0215 415/144 |
| 8,523,189 | B2* | 9/2013 | Harper | F01D 11/008 277/650 |
| 2003/0163985 | A1* | 9/2003 | Stretton | B64D 29/00 60/226.1 |
| 2004/0045765 | A1 | 3/2004 | Porte | |
| 2008/0112796 | A1* | 5/2008 | Coney | F02K 1/386 415/115 |
| 2011/0037233 | A1* | 2/2011 | Harper | F01D 11/008 277/551 |
| 2012/0211943 | A1* | 8/2012 | Hefner | F01D 11/005 277/316 |

OTHER PUBLICATIONS

Jun. 6, 2014 Search Reoprt issued in GB Application No. 1319256.2.

\* cited by examiner

GAS TURBINE WITH GAP SEALING BETWEEN GAS-WASHED COMPONENTS

FIELD OF INVENTION

The present invention relates to a gas turbine engine.

BACKGROUND

Turbofan gas turbine engines (which may be referred to simply as 'turbofans') are typically employed to power aircraft. Turbofans are particularly useful on commercial aircraft where fuel consumption is a primary concern. Typically a turbofan gas turbine engine will comprise an axial fan driven by an engine core. The engine core is generally made up of one or more turbines which drive respective compressors via coaxial shafts. The fan is usually driven directly off an additional lower pressure turbine in the engine core.

The fan draws air into the engine and the air is discharged through a bypass duct which provides a portion of the engine thrust.

Positioned within the bypass duct, axially rearward of the fan, a series of outlet guide vanes (OGVs) are arranged and positioned between an inner and outer casing that define the bypass duct. A series of acoustic panels line the inner and outer casing. To prevent air recirculating behind the acoustic panels and to provide a smooth surface for air flow through the engine, an infill panel is provided between each of the OGVs.

The infill panel is generally a moulded component that includes acoustic chambers, and is typically bolted to the respective inner or outer casing.

A gap exists between the infill panel and the acoustic panel. The distance of the gap can vary depending on a number of factors, including how tightly sections of the inner and/or outer case are connected (e.g. bolted) together. It is important that the gap between the infill panel and acoustic panel is sealed so as to create a smooth gas washed surface, but also to prevent air flow recirculating behind the acoustic panel and/or infill which could cause damage to the engine.

The conventional method to fill the gap is to use a sealant such as polysulphide.

FIG. 1 shows an arrangement of an infill and forward and rearward acoustic panels forming part of an outer casing assembly of the prior art. The casing assembly includes a fan case 1035 substantially coaxial with and connected to a mount ring 1039. The mount ring 1039 is substantially coaxial with and connected to a rear case 1041. Acoustic panels 1034A line the fan case and acoustic panels 1034B line the rear case 1041. The fan outlet guide vanes (OGVs) 1032 are connected to the mount ring, typically via bolts. An infill panel 1040 is positioned between each OGV to fill a void between the forward acoustic panel 1034A and the rearward acoustic panel 1034B. A gap is formed between the forward acoustic panel 1034A and the infill panel 1040. This gap is filled with polysulphide sealant 1048A.

Use of a sealant is advantageous because an effective seal can be produced independently of the gap size. However, the use of sealant to fill the gap leads to increase weight of the engine, increased lead time due to the cure time for the sealant and increased cost. A further problem is that in-service-support may require the removal of a panel, which is time consuming because of the time taken to completely remove the sealant and then re-inject and cure the sealant.

SUMMARY OF INVENTION

The present invention seeks to address one or more of the problems associated with connecting two components having a gas washed surface in gas turbine engines of the prior art.

A first aspect of the invention provides a gas turbine engine having a fan and a bypass duct for discharging airflow from the fan to generate engine thrust. The bypass duct comprises a first component and a second component each having a gas washed surface. The first component is positioned adjacent the second component with a gap therebetween. A sealing strip is positioned in the gap between the first component and the second component distal to the gas washed surfaces of the first and second components. A sealant is positioned between the first and second component proximal to the gas washed surfaces of the first and second components, so as to seal the gap between the first component and the second component from airflow through the bypass duct.

The use of a sealing strip and sealant effectively seals the gap between the first and second components and provides a smooth gas washed surface of the bypass duct. The provision of a sealing strip instead of only using sealant, as in the prior art, has several advantages including weight reduction, reduction in assembly time, and in some embodiments the sealing strip has been found to surprisingly have a damping effect. Use of the sealing strip is advantageous during servicing because it reduces the time required to remove and replace the seal.

The first component may comprise a lip to limit movement of the sealing strip and/or sealant relative to the first component. The provision of a lip aids retention of the sealing strip and/or sealant in the gap between the first and second components. Additionally or alternatively, the second component may comprise a lip to limit movement of the sealing strip and/or sealant relative to the second component.

The lip may be positioned to contact the sealant and form part of the gas washed surface of the first component. In such an arrangement the lip aids retention of both the sealing strip and the sealant. In alternative embodiments the lip may be positioned to be radially offset from the gas washed surface into the gap between the first and second components. Further alternatively, the lip may form part of the gas washed surface and the lip may extend radially into the gap between the first and second component and contact the sealing strip.

The sealing strip may be made from a compressible material, e.g. a rubber, elastomer or compressible closed cell foam. Use of such materials has been found to be advantageous in terms of ease of location in the gap between the first and second components. Furthermore, such materials have been found to have a damping effect.

The sealing strip may form a hollow tube. The use of a hollow tube is further advantageous in reducing weight, easing location and when a compressible material (e.g. rubber, elastomer, compressible closed cell foam) is used, the hollow tube construction has been found to further improve damping. A sealing strip formed of a hollow tube and made from a compressible material has been found to provide an optimal solution because the flexibility of such a sealing strip ensures effective sealing of the gap between the first and second components, and also provides a damping function.

Alternatively, the sealing strip may have a solid cross section.

The sealing strip may have a cross section that is substantially rectangular with rounded ends or substantially circular. Alternatively, the sealing strip may have a cross section that is substantially rectangular or substantially oval.

The sealing strip may be dimensioned so as to be in a compressed or near compressed state when positioned in the gap.

The first or the second component may comprise one or more compression features for compressing the sealing strip in the gap. The compression features help to retain the sealing strip in the gap, and can in some cases increase the surface area to which the sealant bonds.

In embodiments where a hollow compressible tube forms the sealing strip, the compression features can further improve damping performance. For example, the compression features may form a series of "pockets", it has unexpectedly been found that these "pockets" contribute in improving damping.

The compression feature may be a radially extending rib. Ribs have been found to be additionally advantageous because they provide additional rigidity to the edge of the first or the second component. Alternatively, the compression feature may be a circumferentially extending rib.

In alternative embodiments, opposing faces of the first component and the second component may comprise a groove. The sealing strip may extend into the groove of the first and second components. The sealing strip may have two bulbous ends, for example the shape of the sealing strip may be considered to be dog-bone-shaped. The bulbous ends may be positioned in the grooves of the first and second components. The groove of the first and/or second component may be shaped to be complimentary to the bulbous ends such that the sealing strip interlocks with the first and/or second component.

The bypass duct may comprise an inner casing assembly and an outer casing assembly that define an air flow passage. The first and second component may be components of said inner and/or said outer casing assemblies. The inner and/or outer casing assemblies may comprise a casing element (e.g. a fan case, mount ring, or rear case) and one or more liners or infills that are connected to the casing element on a gas-washed side of the casing element.

The first and/or second component may be a liner or infill. For example, the first component may be an infill and the second component may be a liner (e.g. an acoustic liner). Alternatively, the first and second component may both be a liner or the first and second component may both be an infill. In a further alternative embodiment the first or second component may be a casing element.

The gas turbine engine may comprise a plurality of outlet guide vanes (e.g. fan outlet guide vanes). The first component may be an infill positioned between two adjacent outlet guide vanes and the second component may be a liner e.g. an acoustic liner. The invention has been found to be particularly advantageous in such an application.

The outlet guide vanes (OGVs) may be connected to a casing element (e.g. mount ring) and the infill may be mounted to said casing element.

The infill may have a forward end and a rearward end and a liner may be positioned adjacent the infill at both the forward end and the rearward end. A sealing strip and sealant as described above may be used to seal a gap between the infill and the liners at both the forward end and rearward end of the infill.

One or more drainage holes may be provided in the liner and the sealing strip may be provided as a plurality of strip members, the strip members being spaced so as to permit water to exit the drainage holes formed in the liner.

The first and/or second component may be a moulded component. Alternatively, the first or second component may be a composite component. In an exemplary embodiment, the first component may be a moulded infill and the second component may be a composite liner (e.g. an acoustic liner).

A second aspect of the invention provides a gas turbine engine having a fan and a bypass duct for discharging airflow from the fan to generate engine thrust. The bypass duct comprises a first component and a second component each having a gas washed surface. The first component is positioned adjacent the second component with a gap therebetween. A sealant is positioned between the first and second component so as to seal the gap between the first component and the second component from airflow through the bypass duct. The first component comprises a lip to limit movement of the sealant relative to the first component.

The gas turbine engine may comprise a first sealing strip positioned in the gap between the first component and the second component distal to the gas washed surfaces of the first and second components, and the sealant may be positioned proximal to a gas washed surface of the first and second components.

The lip may be configured to limit movement of the sealing strip in addition to limiting movement of the sealant relative to the first component.

The second component may comprise a lip to limit movement of the sealing strip and/or sealant relative to the second component.

As will be appreciated by the person skilled in the art, where applicable, any of, or any combination of, the optional features of the first aspect may be applied to the second aspect.

A third aspect of the invention provides a gas turbine engine having a fan and a bypass duct for discharging airflow from the fan to generate engine thrust. The bypass duct comprises a first component, a second component and a third component each having a gas washed surface. The first component is positioned adjacent and between the second and third components with a gap therebetween. A first sealing strip is positioned in the gap between the first component and the second component distal to the gas washed surfaces of the first and second components. A second sealing strip is positioned in the gap between the first component and the third component distal to the gas washed surfaces of the first and third components. A first sealant is positioned between the first and second component proximal to the gas washed surfaces of the first and second components, so as to seal the gap between the first component and the second component from airflow through the bypass duct. A second sealant is positioned between the first and third component proximal to the gas washed surfaces of the first and third components, so as to seal the gap between the first component and the third component from airflow through the bypass duct.

The first component may be an infill and the second and third components may be a liner (e.g. an acoustic liner). For example, the first component may be an infill positioned between two adjacent outlet guide vanes (e.g. fan outlet guide vanes).

As will be appreciated by the person skilled in the art, where applicable, any of, or any combination of, the optional features of the first aspect may be applied to the third aspect of the invention.

A fourth aspect of the invention provides a method of sealing a gap between two adjacent components of a bypass duct of a gas turbine engine, the two adjacent components each having a gas washed surface. The method comprises positioning a sealing strip in the gap between the two adjacent components; and injecting a sealant in the gap between the two adjacent components on a gas washed side of the adjacent components so as to seal the gap from airflow through the bypass duct.

The method may be such as to form a gas turbine engine according to the first and or second aspect of the invention.

DESCRIPTION OF DRAWINGS

The invention will now be described, by way of example only, with reference to the accompanying drawings in which.

DETAILED DESCRIPTION

Figure 1:
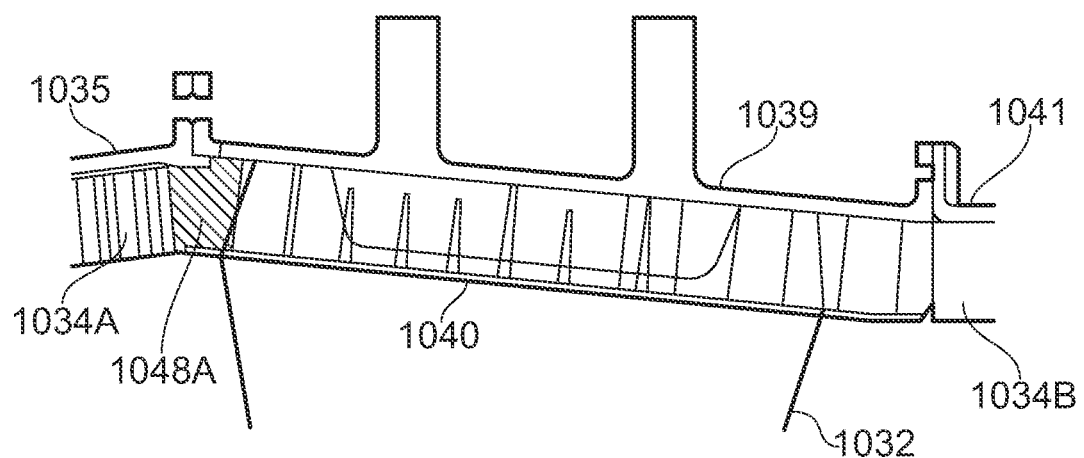
FIG. 1 is a partial cross section through an outer casing assembly of a bypass duct of a gas turbine engine of the prior art.
Figure 2:
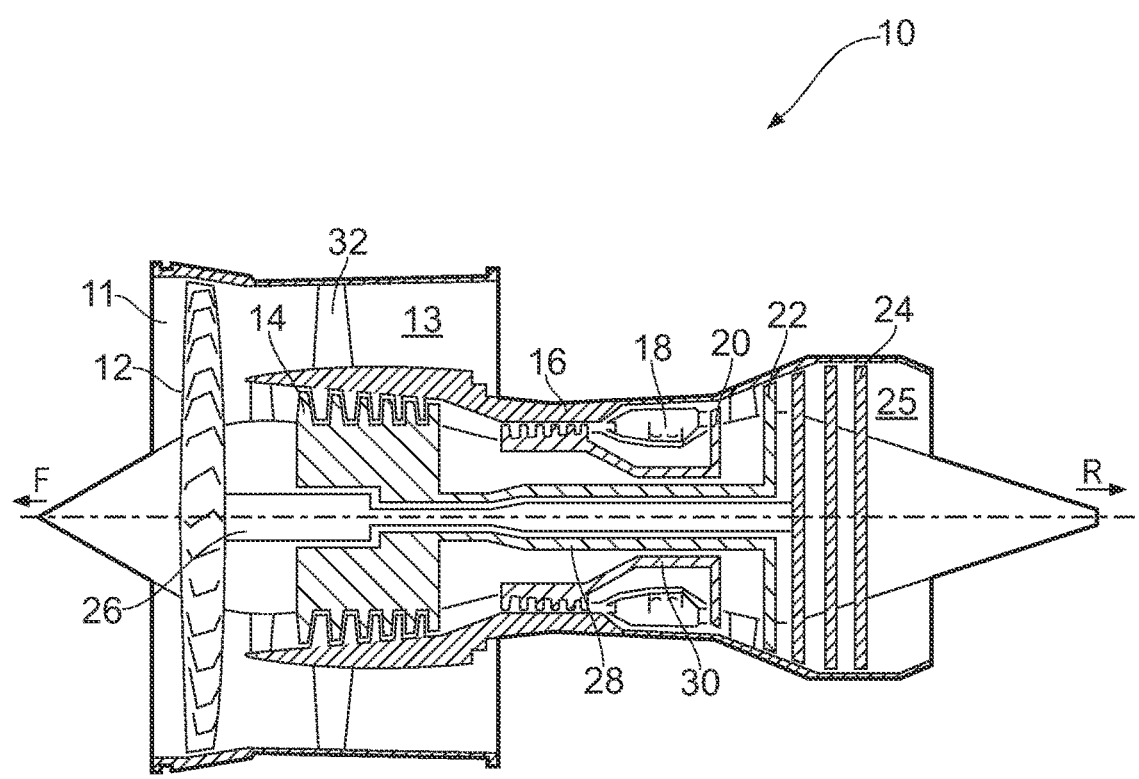
FIG. 2 is a cross-section through the rotational axis of a high-bypass gas turbine engine.

With reference to FIG. 2 a bypass gas turbine engine is indicated at 10. The engine 10 comprises, in axial flow series, an air intake duct 11, fan 12, a bypass duct 13, an intermediate pressure compressor 14, a high pressure compressor 16, a combustor 18, a high pressure turbine 20, an intermediate pressure turbine 22, a low pressure turbine 24 and an exhaust nozzle 25. The fan 12, compressors 14, 16 and turbines 20, 22, 24 all rotate about the major axis of the gas turbine engine 10 and so define the axial direction of the gas turbine engine.

In the present application a fore or a forward direction F and an aft or a rearward direction R is defined with respect to a generally axial direction of working airflow through the gas turbine engine.

Air is drawn through the air intake duct 11 by the fan 12 where it is accelerated. A significant portion of the airflow is discharged through the bypass duct 13 generating a corresponding portion of the engine thrust. The remainder is drawn through the intermediate pressure compressor 14 into what is termed the core of the engine 10 where the air is compressed. A further stage of compression takes place in the high pressure compressor 16 before the air is mixed with fuel and burned in the combustor 18. The resulting hot working fluid is discharged through the high pressure turbine 20, the intermediate pressure turbine 22 and the low pressure turbine 24 in series where work is extracted from the working fluid. The work extracted drives the intake fan 12, the intermediate pressure compressor 14 and the high pressure compressor 16 via shafts 26, 28, 30. The working fluid, which has reduced in pressure and temperature, is then expelled through the exhaust nozzle 25 generating the remainder of the engine 10 thrust.

An inner and outer casing assembly defines a section of the bypass duct 13. A circumferential series of outlet guide vanes (OGVs) 32 are positioned between the inner and outer casing assemblies.

Figure 3:
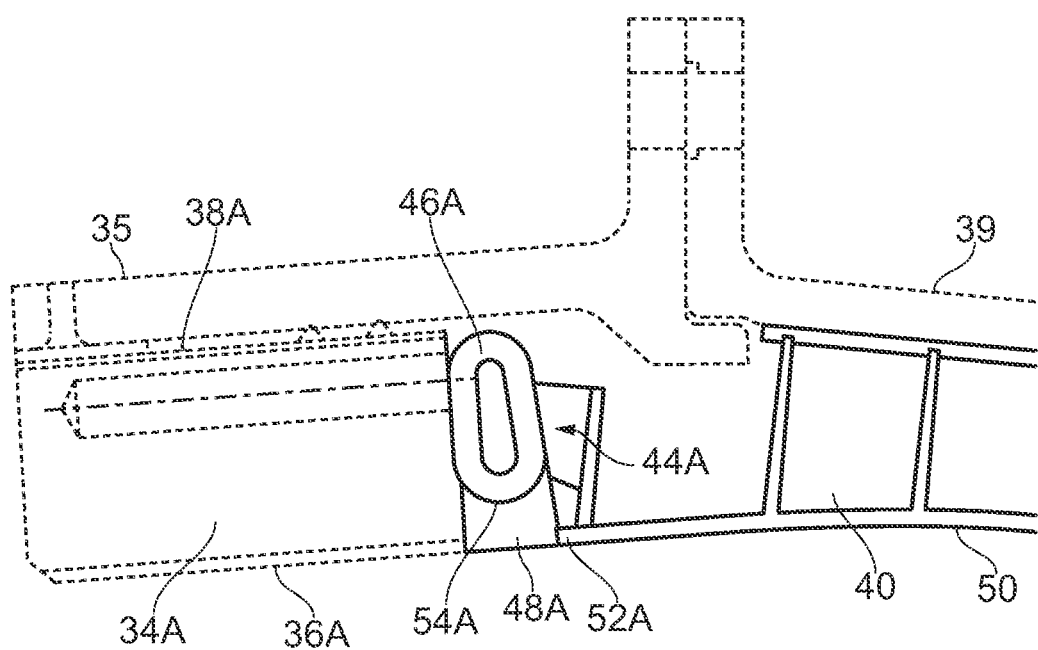
FIG. 3 is a partial cross section through an infill, an acoustic panel positioned fore of the infill and a sealing arrangement sealing a gap therebetween.
Figure 4:
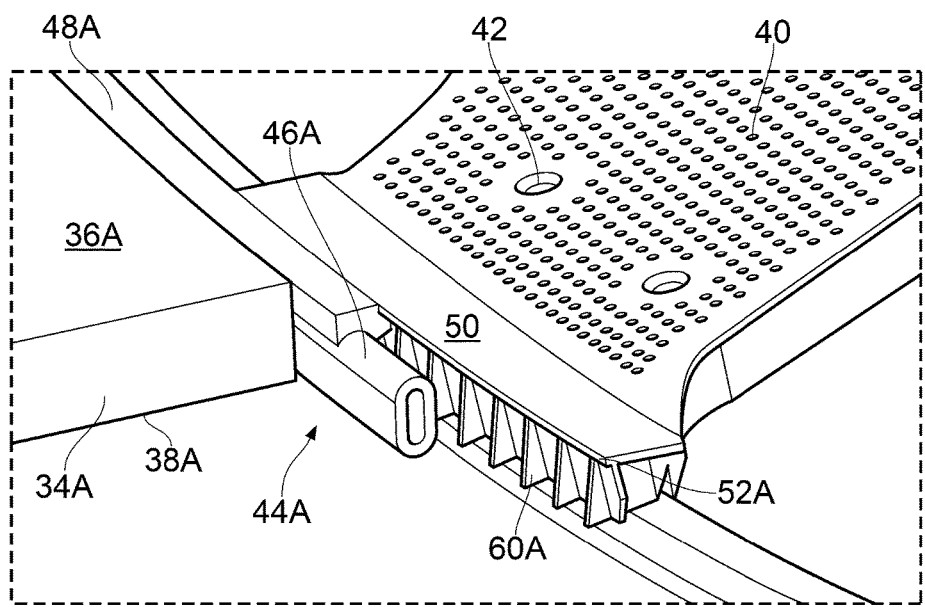
FIG. 4 is a perspective view of the acoustic panel, infill and sealing arrangement of FIG. 3.

The inner and outer casing assemblies include a series of acoustic panels positioned fore and aft of the OGVs. Acoustic panels are well understood in the art and can have any suitable construction. In the present embodiment, the acoustic panel is formed of a layer of honeycomb cells backed on a non-gas-washed face with an impervious sheet and backed on a gas-washed face with a porous sheet. An acoustic panel 34A positioned fore of the OGVs is illustrated in FIGS. 2 and 3 and has a non-gas-washed surface (or face) 38A and a gas-washed surface (or face) 36A.

The OGV 32 connects to an inner and an outer casing element (e.g. a mount ring of the outer casing assembly) at a position radially set back from the gas-washed surface 36A of the acoustic panel. To prevent air flow penetrating the casing structure, e.g. circulating the non-gas washed surface 38A of the acoustic panel, which could cause damage to the engine structure, and also to provide a bypass duct with a smooth gas washed surface, an infill 40 is provided. The infill is positioned between two adjacent OGVs and mounted to the respective casing element, in the present embodiment using bolts through holes 42.

A gap 44A is provided between the acoustic liner 34A and the infill 40. To fill the gap 44A a sealing arrangement is used.

The sealing arrangement includes a sealing strip 46A positioned in the gap 44A between the infill 40 and the acoustic panel 34A. A sealant 48A fills the remaining gap and forms a surface coincident with the gas washed surface 50 of the infill 40 and the gas washed surface 36A of the acoustic panel 34A. In the presently described embodiment, a lip 52A protrudes from an edge of the infill 40 and extends so as to protrude over the top of a portion of the sealant 48A.

The sealing strip 46A is formed from a closed cell compressible foam. However, in alternative embodiments the sealing strip may be formed from a rubber or elastomer. The sealing strip is formed as a hollow tube and has a substantially rounded rectangle cross section (i.e. the sealing strip has a cross section where the outer perimeter can be considered to be defined by a rectangle having a semi-circle connected at each longitudinal end). The sealing strip is positioned in the gap such that one of the rounded ends 54A of the sealing strip is in contact with the sealant 48A (once the sealant is injected into the gap 44A). The provision of rounded ends instead of flat ends increases the contact area to which the sealant 48A can bond. Further, as will be discussed below, a rounded rectangular cross section can optimise damping compared to other suitable shaped sealing strips.

The sealant 48A is formed of polysulphide, but any suitable sealant may be used. The sealant is injected into the remaining gap between the infill 40 and the acoustic panel 34A. As can be seen most clearly in FIG. 3, the sealant 48A contacts the rounded end 54A of the sealing strip, bonds thereto and projects underneath the lip 52A of the infill 40. In this way, the lip 52A of the infill 40 acts to retain the sealant 48A and the sealing strip 46A in the gap 44A.

Figure 5:
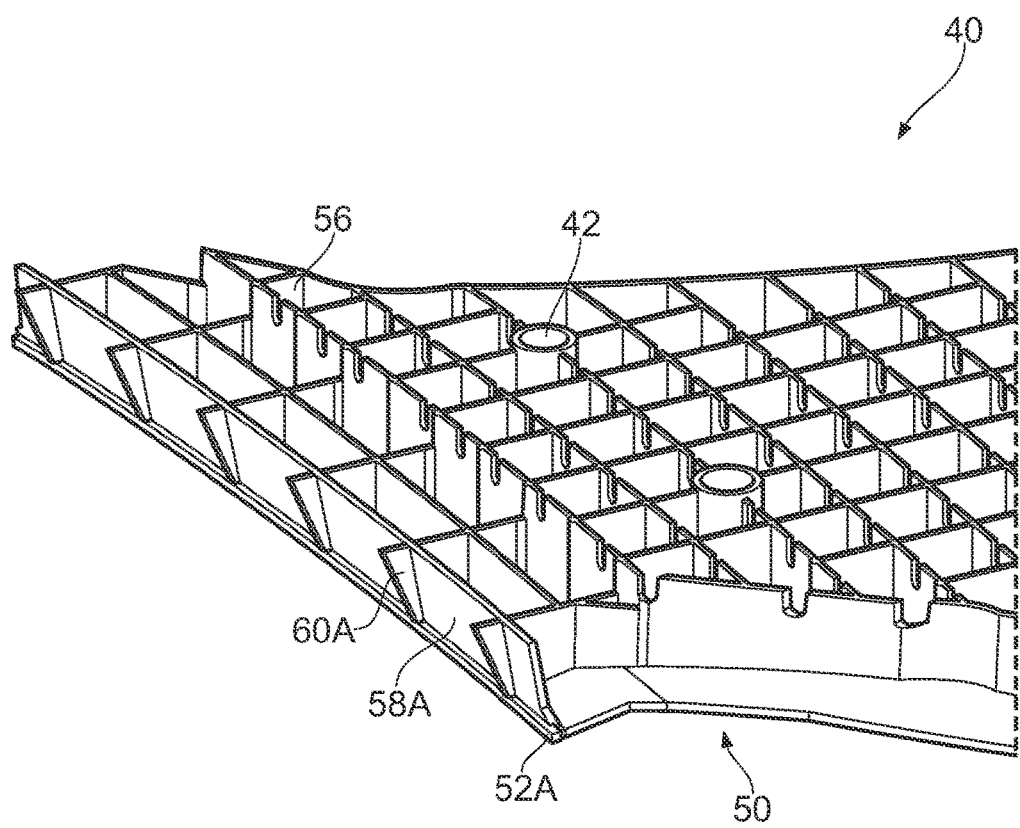
FIG. 5 shows a perspective view from a non-gas-washed surface of the infill of FIGS. 2 and 3.

Referring to FIG. 5, a forward portion of the infill 40 is shown in more detail. The infill 40 is a moulded component. The infill includes a plurality of acoustic chambers 56 (only one labelled for clarity). The forwardmost wall 58A of the infill 40 defines one of the walls of the gap 44A shown in FIGS. 2 and 3. A plurality of projections (or ribs) 60A (only one labelled for clarity) protrude from the wall 58A, and in use protrude in to the gap 44A and compress the sealing strip 46A. In the present embodiment the projections are arranged so as to protrude into the gap 44A less towards the gas-washed surface 50 of the infill than at a position away from the gas washed surface.

The projections 60A provided on the wall 58A of the infill provide multiple functions. Firstly, the projections compress the sealing strip 46A which contributes to retention of the sealing strip 46A in the gap 44A. It has been found that providing a hollow tubular sealing strip made from a compressible material and compressing the sealing strip in the gap provides a damping effect. This is particularly applicable in this embodiment because the projections 60A are configured and arranged so as to form a series of pockets (open or closed) in the sealing strip which has surprisingly been found to further contribute to damping. The projections 60A further provide a stiffening feature to the end wall 58A of the infill 40. Yet further, the projections 60A increase the surface area to which the sealant 48A can bond, further improving retention of the sealant in the gap 44A.

The above described sealing arrangement advantageously seals the gap 44A between the acoustic panel 34A and the infill 40 and has lower weight than sealing arrangements of the prior art, because the sealing strip 46A is lighter in weight than if sealant alone were used to fill the gap 44A.

Further the lip 52A improves the retention of the sealing strip 46A and the sealant 48A in the gap 44A. Finally, the combination of the sealing strip and the projections 60A provides an improved damping effect compared to the use of sealant alone.

The sealing arrangement also has advantages in terms of manufacture and service. To fill the gap 44A between the infill 40 and the acoustic panel 34A, firstly the sealing strip 46A is placed in the gap 44A. Then the sealant 48A is injected on top of the sealing strip 46A and underneath the lip 52A. In this way, much less sealant is required compared to the sealing arrangements of the prior art, this means that the time taken to cure the sealant can be reduced. In service, the time taken to remove the infill 40 during maintenance is also reduced because it is quicker and easier to remove the smaller volume of sealant of the described embodiment than the larger volume of sealant of the prior art.

Figure 6:
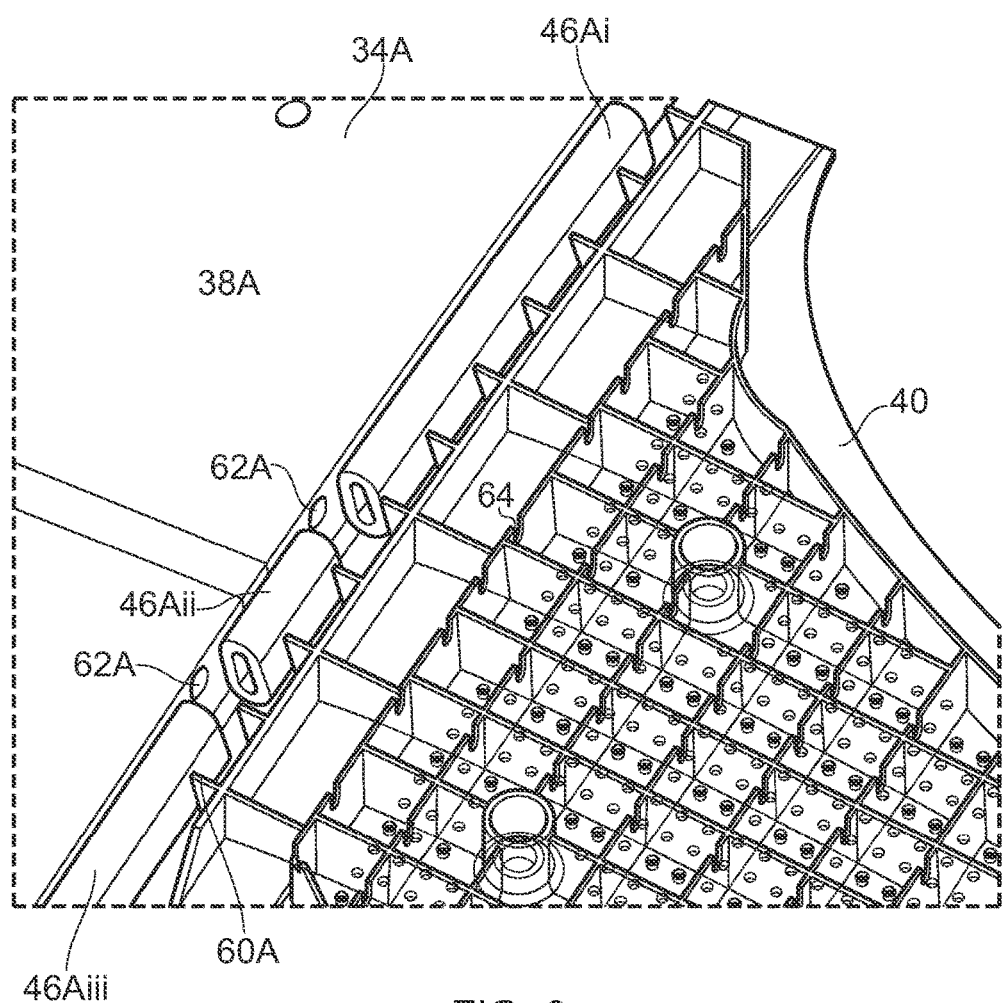
FIG. 6 shows a perspective view from a non-gas-washed surface of the acoustic panel, infill and sealing arrangement of FIGS. 3 and 4.

Referring to FIG. 6, the gas washed surface 36A of the acoustic panel 34A is often porous. This means that water can enter in acoustic panel. To drain the water from the acoustic panel 34A, drainage holes 62A are provided. The drainage holes exit the acoustic panel at the gap 44A. Channels 64 (only one labelled for clarity) are provided in the infill to permit drainage of water from the gap 44A. To permit water to flow from the drainage holes 62A to the channels 64, the sealing strip 46A is provided as a plurality of sealing strip members 46Ai, 46Aii and 46Aiii. The sealing strip members are spaced in the gap 44A so as to avoid covering the drainage holes 62A.

Figure 7:
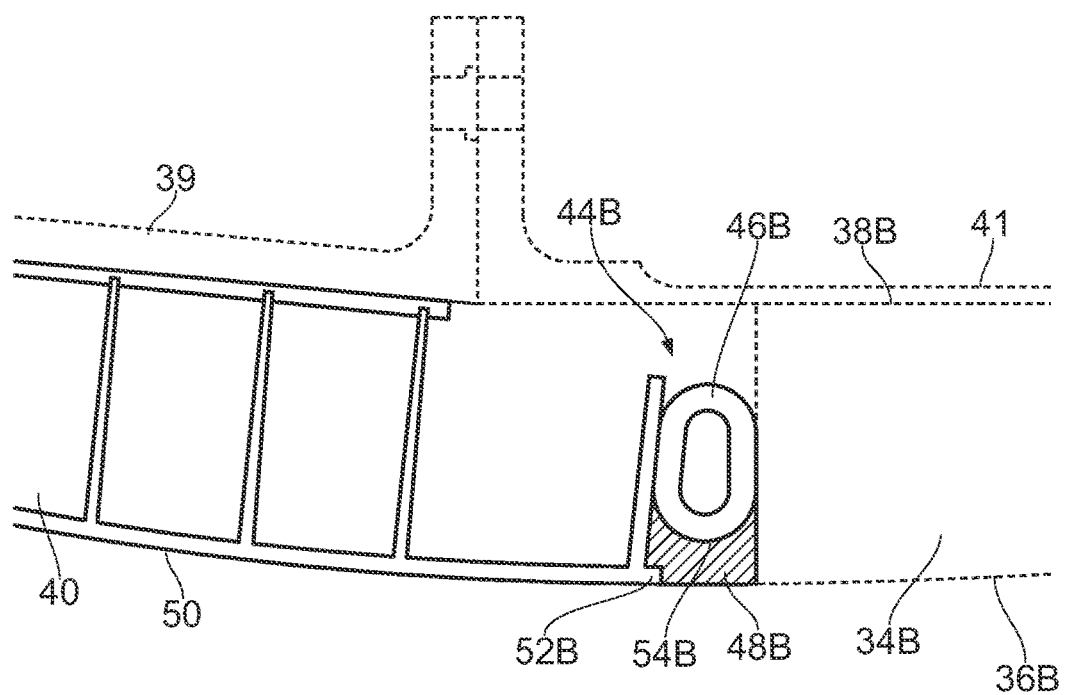
FIG. 7 shows a partial cross section through the infill shown in FIGS. 2 to 5, an acoustic panel positioned aft of the infill and a sealing arrangement sealing a gap therebetween.

Referring now to FIG. 7, a similar arrangement is used between the infill 40 and an acoustic panel 34A positioned aft of the OGVs. Similar features are given similar reference numerals as the previously described embodiment, but with a suffix "B", only the differences will be described in detail here. Similar to the sealing arrangement previously described, between the mount ring 39 and rear case 41, a sealing strip 46B and sealant 48B are used to seal a gap 44B between the infill 40 and the acoustic panel 34B. Similarly to previously described, the infill 40 is provided at a rear end with a lip 52B that acts to retain the sealant and sealing strip in the gap 44B. In the present embodiment, no projections are provided on the rear wall; instead the rear wall is a substantially smooth surface. However, in alternative embodiments the rear wall may include projections similar to those described for the front wall 58A of the infill 40.

Figure 8:
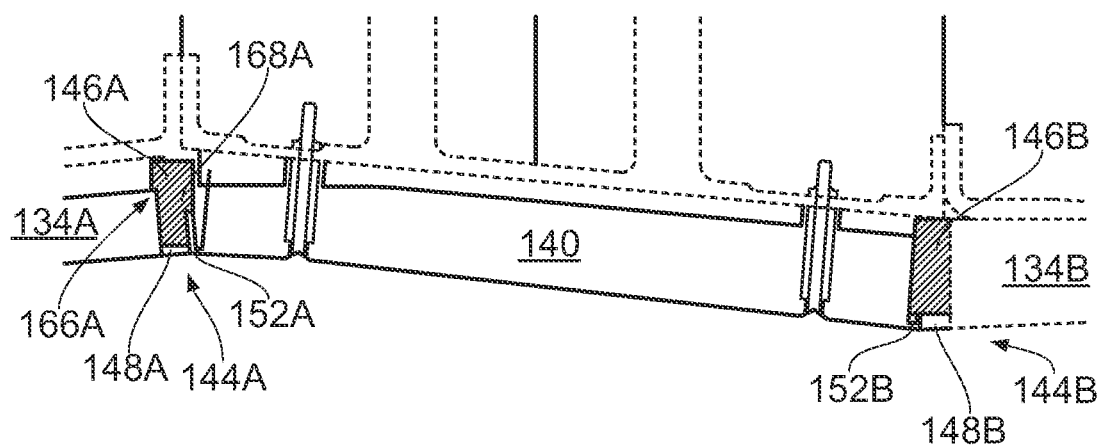
FIG. 8 shows a partial cross section through an alternative infill with an acoustic panel positioned fore and aft of the infill and a sealing arrangement sealing a gap between the infill and the acoustic panels.

Referring now to FIG. 8, an alternative sealing arrangement is shown. Similar features are given similar reference numerals as the previously described embodiment, but with a prefix "1". Only the differences will be described in detail here.

Referring firstly to the gap 144A at the front of the infill panel 140, similar to the previously described embodiment, a sealing strip 146A is positioned in the gap 144A and a sealant 148A fills the remainder of the gap 144A and forms part of the gas washed surface of the bypass duct. However, in the embodiment shown in FIG. 8 the cross-section of the sealing strip 146A and the configuration of the lip 152A of the infill 140A differs to that of the previously described embodiment.

When in a non-compressed state (i.e. not positioned in the gap 144A), the sealing strip 146A has a substantially rectangular cross section. Once positioned in the gap 144A the sealing strip deforms to include a stepped portion 166A that is seated beneath the acoustic panel 134A.

The lip 152A of the infill 140 is configured to extend radially away from the gas washed surface towards the sealing strip 146A. The lip 152A is configured to be seated on and to compress and deform the sealing strip 146A so as to form a stepped portion 168A of the sealing strip 146A. Compressing and deforming the sealing strip 146A to form the stepped portion 168A further improves retention of the sealing strip 146A in the gap 144A.

Now referring to the gap 144B at the rear of the infill 140, similarly to the gap 144B at the front of the infill 140, a sealing strip 146B and a sealant 148B are used to fill the gap. However, the configuration of the lip 152B differs from the lip at the front of the infill 140.

In an uncompressed state, the sealing strip 148B is substantially rectangular in cross section. Once positioned in the gap 144B, the sealing strip 148B is compressed and deformed to be substantially trapezoidal in cross section. In alternative embodiments, the sealing strip may be trapezoidal in an uncompressed state. The lip 152B extends radially away from the gas washed surface of the bypass duct, and abuts a radially inner surface of the sealing strip 148B to retain the sealing strip in position in the gap 144B.

Figure 9:
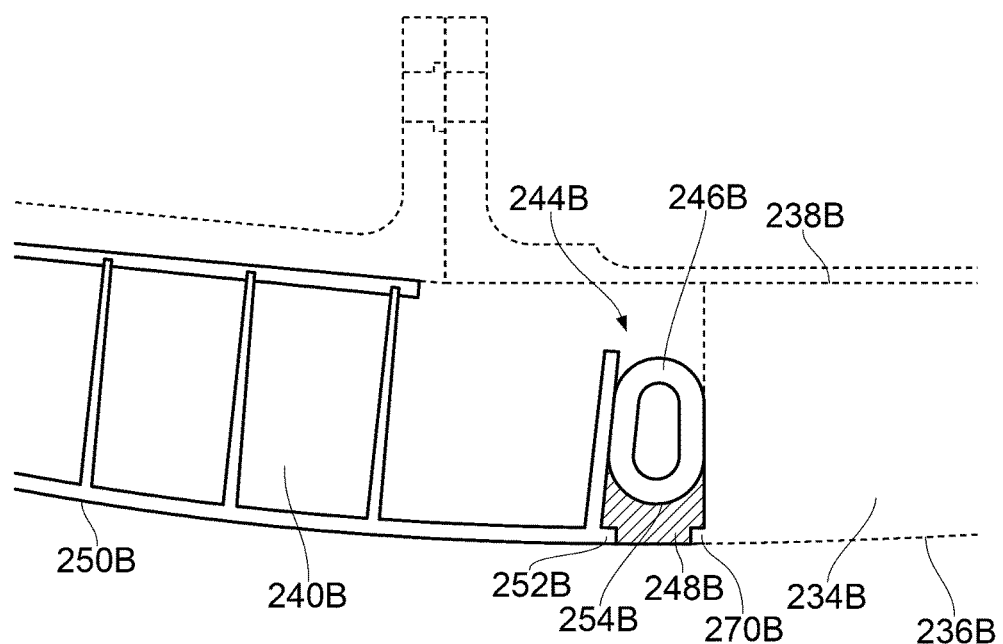
FIG. 9 shows a partial cross section through a further alternative infill with an acoustic panel positioned aft of the infill and a sealing arrangement sealing a gap therebetween.

A yet further alternative embodiment is shown in FIG. 9. FIG. 9 illustrates a gap 244B at the rear of the infill 240, but a similar arrangement could also be used at the front of the infill. In the embodiment shown in FIG. 9, the sealing strip 246B is similar to the sealing strip shown in FIGS. 3 to 6. However, a lip 270B is provided on the acoustic panel 234B as well as a lip 252B being provided on the infill 240. The sealant 248B fills the gap between the sealing strip and the gas washed surface of the bypass duct. The provision of two lips improves retention of the sealant and the sealing strip.

Figure 10A:
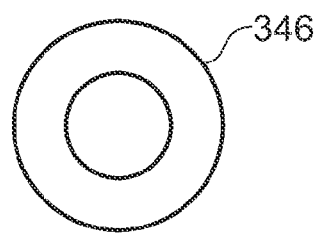
FIGS. 10A to 10E show a variety of cross sections of a sealing strip that may form part of a sealing arrangement similar to those shown in any one of FIGS. 3, 4 and 6 to 9.
Figure 10B:
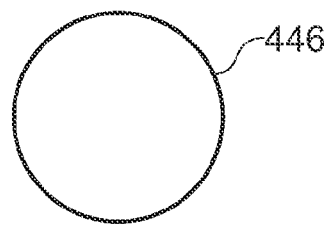
Figure 10C:
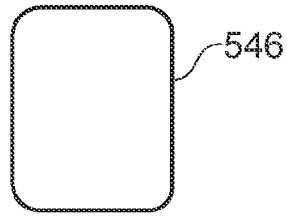
Figure 10D:
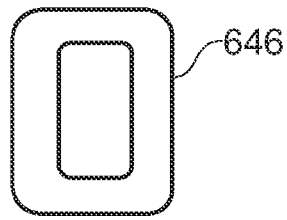
Figure 10E:
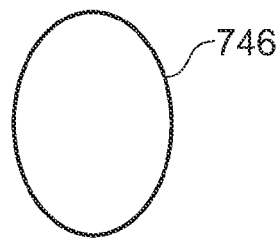

Referring now to FIGS. 10A to 10E, further alternative cross sections for a sealing strip are shown. For example, the sealing strip may have a cross section of a circular ring 346 as shown in FIG. 10A; a substantially solid circle 446 as shown in FIG. 10B; substantially solid rectangle with rounded corners 546 as shown in FIG. 10C; a hollow rectangle with rounded corners 646 as shown in FIG. 10D; or a hollow or full oval 746 as shown in FIG. 10E. As will be appreciated by the person skilled in the art, the sealing strip may have any other suitable cross section.

It will be appreciated by one skilled in the art that, where technical features have been described in association with one embodiment, this does not preclude the combination or replacement with features from other embodiments where this is appropriate. Furthermore, equivalent modifications and variations will be apparent to those skilled in the art from this disclosure. Accordingly, the exemplary embodiments of the invention set forth above are considered to be illustrative and not limiting.

For example, in the described embodiments the lip is located to be aligned with the gas washed surface of the bypass duct, but in alternative embodiments the lip may be offset from the gas washed surface. Additionally or alternatively, the lip may be provided on the acoustic panel in addition to or as an alternative to being provided on the infill.

Figure 11:
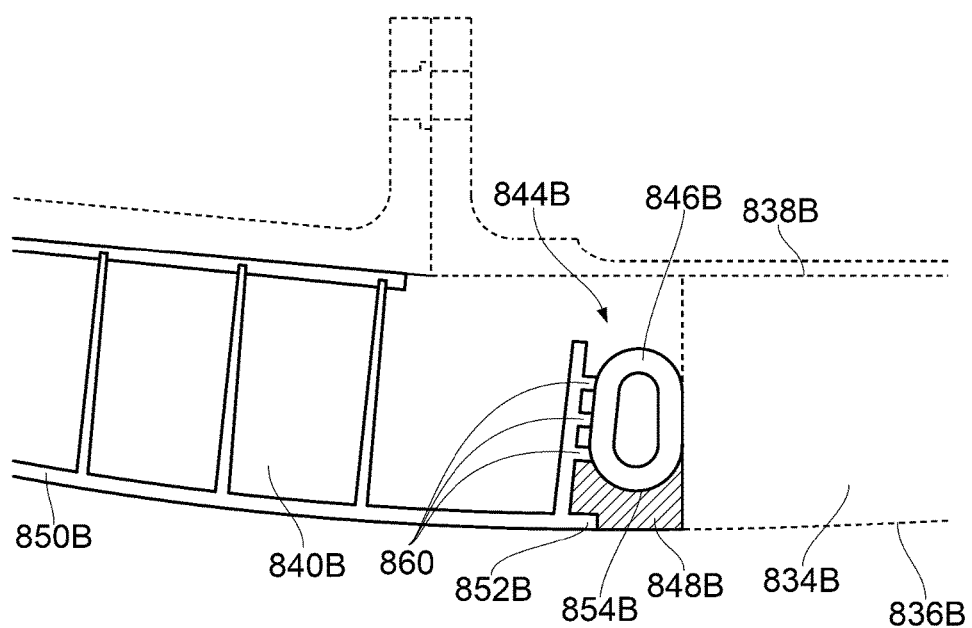
FIG. 11 shows a partial cross section through a further alternative infill with an acoustic panel positioned aft of the infill and a sealing arrangement sealing a gap therebetween.

The infill panel is provided with projections 60 which act as compression features to compress and/or locate the sealing strip. In the described embodiment the projections extend radially, but in alternative embodiments the projections may extend circumferentially, for example as indicated at 860 in FIG. 11. Further alternatively, projections may be additionally or alternatively provided on the acoustic liner.

In alternative embodiments, projections may be provided at the rear of the infill additionally or alternatively to the projections on the front of the infill.

The described sealing arrangements are positioned between an infill and an acoustic panel, but in alternative embodiments the sealing arrangement may be used in any location where there is a gap between two adjacent components; for example, between an OGV and an infill, between adjacent infills, or between adjacent panels.

In a contemplated embodiment, the outer or inner casing element (e.g. fan case, mount ring, rear case or outer core casing) to which the OGVs are connected may extend radially into the bypass duct by a greater distance to the described embodiments removing the need for an infill. In such an embodiment the sealing arrangement may seal a gap between the casing element and an acoustic panel.

In the described embodiments the sealant is positioned directly adjacent the sealing strip. However, in alternative embodiments a sealing enhancing or binding member may be located between the sealing strip and the sealant. For example, the sealing strip may be wrapped in a meshed material and the sealant may be adjacent and bond to the meshed material and the sealing strip.

Figure 12:
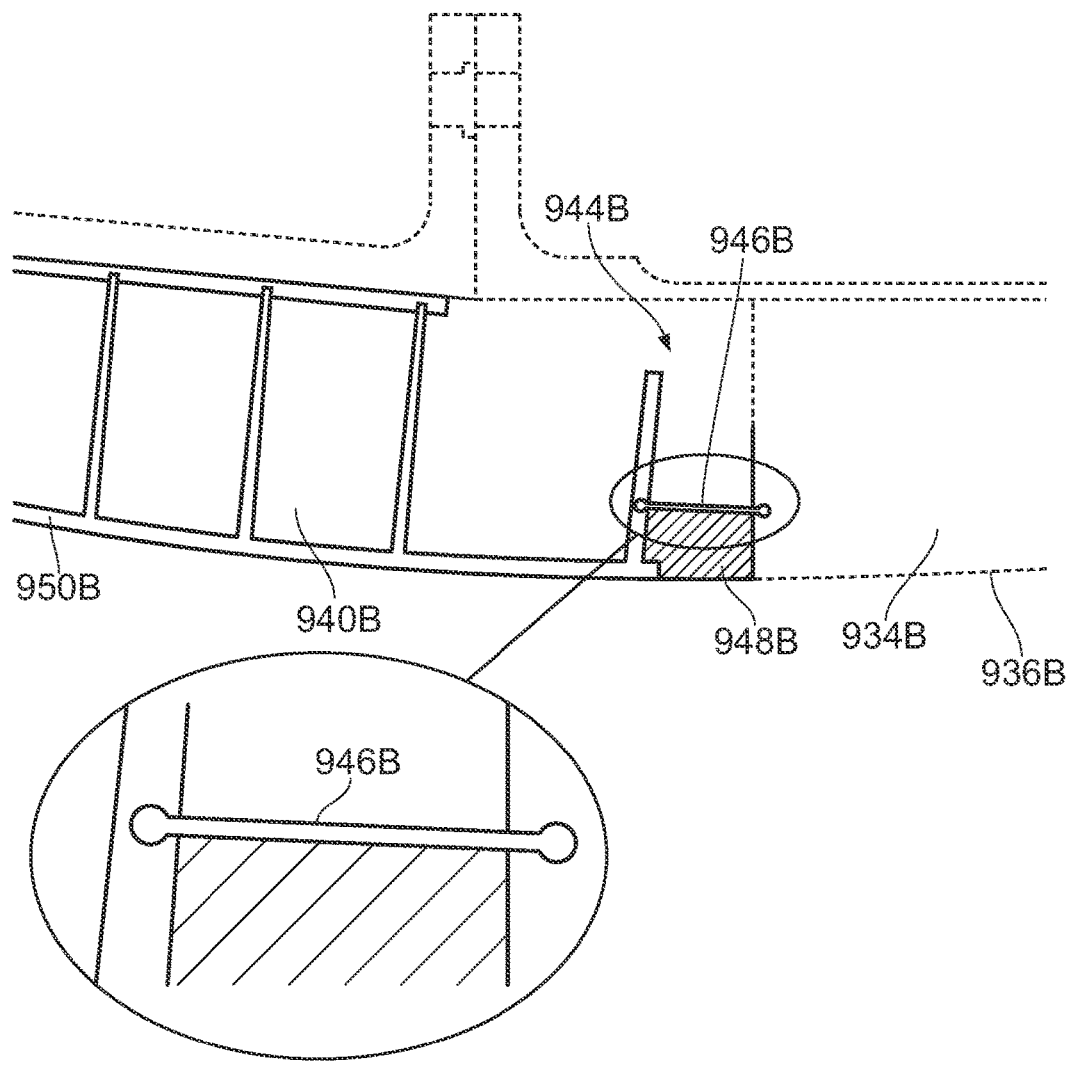
FIG. 12 shows a partial cross section through an infill with an acoustic panel positioned aft of the infill and an alternative sealing arrangement sealing a gap therebetween.

A further alternative embodiment is illustrated in FIG. 12. The sealing arrangement of FIG. 12 includes a sealing strip 946B positioned in the gap 944B between the infill 940B and the acoustic panel 934B. A sealant 948B fills the remainder of the gap 944B between the sealing strip and the gas washed surfaces 950B, 936B of the infill 940B and the acoustic panel 934B, so as to form a surface coincident with the gas washed surfaces of the infill and the acoustic panel. The sealing strip 946B is an elongate strip that extends between the infill and the acoustic panel. Each axial end of the sealing strip is bulbous in shape, such that the shape of the sealing strip could be considered to be a dog-bone shape. The infill and the acoustic panel each include a groove shaped to closely accommodate the bulbous ends of the sealing strip.

The invention claimed is:

1. A gas turbine engine having a fan and a bypass duct for discharging airflow from the fan to generate engine thrust, the bypass duct comprising:
   a first component and a second component each having a gas washed surface, the first component being positioned adjacent the second component with a gap therebetween;
   a sealing strip made from a compressible material in the shape of a hollow tube, the sealing strip positioned in the gap between the first component and the second component distal to the gas washed surfaces of the first and second components; and
   a sealant positioned between the first and second component proximal to the gas washed surfaces of the first and second components, so as to seal the gap between the first component and the second component from airflow through the bypass duct,
   wherein the first or second component comprises a plurality of projections configured so as to compress the sealing strip in the gap and arranged so as to define a plurality of pockets in the sealing strip.

2. The gas turbine engine according to claim 1, wherein the first component comprises a lip to limit movement of the sealing strip and/or sealant relative to the first component.

3. The gas turbine engine according to claim 2, wherein the lip is positioned to contact the sealant and form part of the gas washed surface of the first component.

4. The gas turbine engine according to claim 1, wherein the sealing strip is made from a rubber, elastomer or compressible closed cell foam.

5. The gas turbine engine according to claim 1, wherein the sealing strip has cross section that is substantially rectangular with rounded ends or substantially circular.

6. The gas turbine engine according to claim 1, wherein the plurality of projections comprises one or more radially extending projections.

7. The gas turbine engine according to claim 1, wherein opposing faces of the first component and the second component comprise a groove, and wherein the sealing strip extends into the groove of the first and second components.

8. The gas turbine engine according to claim 7, wherein the sealing strip has two bulbous ends, the bulbous ends being positioned in the grooves of the first and second components.

9. The gas turbine engine according to claim 1, wherein the first and/or second component is a liner or infill.

10. The gas turbine engine according to claim 9 comprising a plurality of outlet guide vanes, and wherein the first component is an infill positioned between two adjacent outlet guide vanes and the second component is a liner.

11. The gas turbine engine according to claim 10, wherein the infill has a forward end and a rearward end and a liner is positioned adjacent the infill at both the forward end and the rearward end, and the sealing strip and sealant is used to seal a gap between the infill and the liners at both the forward end and rearward end of the infill.

12. The gas turbine engine according to claim 10, wherein one or more drainage holes are provided in the liner and the sealing strip is provided as a plurality of strip members, the strip members being spaced so as to permit water to exit the drainage holes formed in the liner.

13. The gas turbine engine according to claim 1, wherein the first and/or second component is a moulded component.

14. The gas turbine engine according to claim 1, wherein the plurality of pockets are closed pockets.

15. A method of sealing a gap between two adjacent components of a bypass duct of a gas turbine engine, the two adjacent components each having a gas washed surface, the method comprising:

positioning a sealing strip in the gap between the two adjacent components, the sealing strip made from a compressible material in the shape of a hollow tube; and injecting a sealant in the gap between the two adjacent components on a gas washed side of the adjacent components so as to seal the gap from airflow through the bypass duct, wherein at least one of the adjacent components comprises a plurality of projections configured so as to compress the sealing strip in the gap and arranged so as to define a plurality of pockets in the sealing strip.

16. A gas turbine engine having a fan and a bypass duct for discharging airflow from the fan to generate engine thrust, the bypass duct comprising:

a first component and a second component each having a gas washed surface, the first component being positioned adjacent the second component with a gap therebetween;

a sealing strip made from a compressible material in the shape of a hollow tube, the sealing strip positioned in the gap between the first component and the second component distal to the gas washed surfaces of the first and second components; and a sealant positioned between the first and second component proximal to the gas washed surfaces of the first and second components, so as to seal the gap between the first component and the second component from airflow through the bypass duct, wherein the first or second component comprises a plurality of elongated flat ribs, each of the elongated flat ribs extending from the first or second component to a distal edge, whereby the elongate flat ribs are arranged so as to contact the sealing strip along an edge of the elongate flat ribs so as to define a plurality of pockets in the sealing strip.

17. A gas turbine engine having a fan and a bypass duct for discharging airflow from the fan to generate engine thrust, the bypass duct comprising:

a first component and a second component each having a gas washed surface, the first component being positioned adjacent the second component with a gap therebetween;

a sealing strip made from a compressible material in the shape of a hollow tube, the sealing strip positioned in the gap between the first component and the second component distal to the gas washed surfaces of the first and second components; and a sealant positioned between the first and second component proximal to the gas washed surfaces of the first and second components, so as to seal the gap between the first component and the second component from airflow through the bypass duct, wherein the first or second component comprises a support member extending from the first or second component to a distal end, the support member supporting a plurality of ribs that extend perpendicular to the support member so as to contact the sealing strip and define a plurality of pockets in the sealing strip.

* * * * *